United States Patent [19]

Cagle

[11] Patent Number: 5,370,797
[45] Date of Patent: Dec. 6, 1994

[54] HIGH ASPECT RATIO TRIPLE-PLUS WARP WIRE MESH

[76] Inventor: William S. Cagle, 7021 E. 77th Pl., Tulsa, Okla. 74133

[21] Appl. No.: 92,017

[22] Filed: Jul. 15, 1993

[51] Int. Cl.$^5$ ............................................. B01D 39/08
[52] U.S. Cl. .................................. 210/499; 210/507; 245/2; 29/163.8
[58] Field of Search ............... 210/499, 507; 166/227, 166/230; 245/2, 8; 139/383.2, 425.1; 29/163.5, 163.8

[56] References Cited

U.S. PATENT DOCUMENTS

| | | | |
|---|---|---|---|
| 2,024,806 | 12/1935 | Disbro | 209/403 |
| 2,775,550 | 12/1956 | Harlow | 196/147 |
| 3,087,699 | 4/1963 | Foster | 245/2 |
| 3,713,875 | 1/1973 | Beyer et al. | 117/98 |
| 4,732,670 | 3/1988 | Nelson | 209/314 |

FOREIGN PATENT DOCUMENTS 12636 of 1900 United Kingdom ................... 245/2

*Primary Examiner*—Robert A. Dawson
*Assistant Examiner*—W. L. Walker
*Attorney, Agent, or Firm*—Catalano, Zingerman & McKay

[57] ABSTRACT

A screen for removing undesirable particles from a liquid has a flat parallel array of shute filaments spaced apart less than a preselected minimal linear dimension of the undesirable particles transverse to a parallel array of groups of 3 to 10 warp filaments, the warp filaments of each group being oppositely woven about and between the shute filaments taken individually or in pairs to secure the shute filaments and maintain the spaces therebetween, the spaces between groups of warp filaments being greater than the preselected minimal linear dimension of the undesirable particles so that the screen is characterized by rectangular flow apertures therethrough, the diameter of the shute filaments being in the order of at least 1.1 times the diameter of the warp filaments so that the apertures have an aspect ratio ranging as great as 4 to 10 or more, even for filaments having diameter ranging as small as 0.0070 to 0.0010 inches or less.

9 Claims, 3 Drawing Sheets

HIGH ASPECT RATIO TRIPLE-PLUS WARP WIRE MESH

BACKGROUND OF THE INVENTION

This invention relates generally to screens and more particularly concerns screens used for removing undesirable particles from a liquid such as oil well drilling fluids.

The factors of primary importance in vibrating screens are particle separation, fluid throughput or conductance and screen life. Finer particle separation results in a higher percentage of impurities being removed from the screened fluid. Higher conductances are desirable because more fluid can be processed per square foot of screen area, thereby reducing costs. Doubling the conductance doubles the liquid throughput. Longer screen life saves time and money. Since the mid-seventies the vibrating screen industry trend has been to decrease wire diameter in order to achieve higher conductance. The result has been finer separation and higher conductance but shorter screen life. In order to increase screen life, the industry has resorted to various types of bonded screens such as plastic-backed, metal-backed or bonded-backup, but bonded screens are more expensive.

In order to maintain high conductance and screen life, I have developed double shute or warp screens which are described in my U.S. patent application Ser. Nos. 07/870,486, filed Apr. 16, 1992, which is now U.S. Pat. No. 5,256,291, and 07/893,715, filed Jun. 5, 1992, which is now U.S. Pat. No. 5,256,292. For a double warp plain weave screen having warp and shute wires of the same material and properties, the shute diameter must be at least 1.4 times the warp diameter to prevent sleaziness. Since the shute diameter controls the conductance, if the shute diameter is fine enough to give very high conductance, the warp diameter is so fine that the screen has a low tensile strength and therefore shorter life.

Thus, while the double warp screens described in my earlier patent applications provide improved conductance and life over the previous art, an undesirable compromise between separation, conductance and life is often necessary for finer screens having very high ranges of conductance.

Coarse triple warp plain weave screens have been used in the past, ranging from very coarse up to about 50–60 mesh. The aspect ratios of the rectangular openings of these known triple warp screens vary from about 4/1 to 10/1 but the ratios of their shute to warp diameters are 1.5/1 or greater. Use of these higher diameter ratio screens decreases conductance to such unacceptable levels that known triple warp screens cannot be used in many finer mesh applications.

It is, therefore, a primary object of this invention to provide a vibrating screen composed of fine wire in the order of approximately 0.0010" to 0.0070" which provides finer particle separation, higher conductance and longer screen life than presently known screens.

SUMMARY OF THE INVENTION

In accordance with the invention, a screen is provided for removing undesirable particles from a liquid in which a substantially flat parallel array of shute filaments are spaced at less than a preselected minimal linear dimension of undesirable particles and a parallel array of groups of warp filaments runs transverse to the shute filaments. The warp filaments of each group are oppositely woven about and between the shute filaments taken individually or in pairs to secure the shute filaments and maintain the spaces therebetween. The groups of shute filaments have spaces therebetween smaller than the preselected minimal linear dimension of the undesirable particles so that the screen is characterized by elongated rectangular flow apertures therethrough.

Each group includes from 3 to 10 or more warp filaments and the shute filament diameters are as small as in the order of 1.1 times the warp filament diameter. Conductance is increased by making the rectangular apertures longer. The life of the screen is increased by increasing the number of warp wires to achieve the required tensile strength. Finer particle separation is achieved by making the short dimension of the rectangle smaller.

Screens formed by this weaving of groups of three or more warp filaments transverse to shute filaments which are as small as in the order of 1.1 times the diameter of the warp filaments provide meshes having higher aspect ratios with smaller filament diameters than achievable using presently known weaves of filaments of this range of diameter. They therefore have finer particle separation, higher conductance and longer screen life than known weaves.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
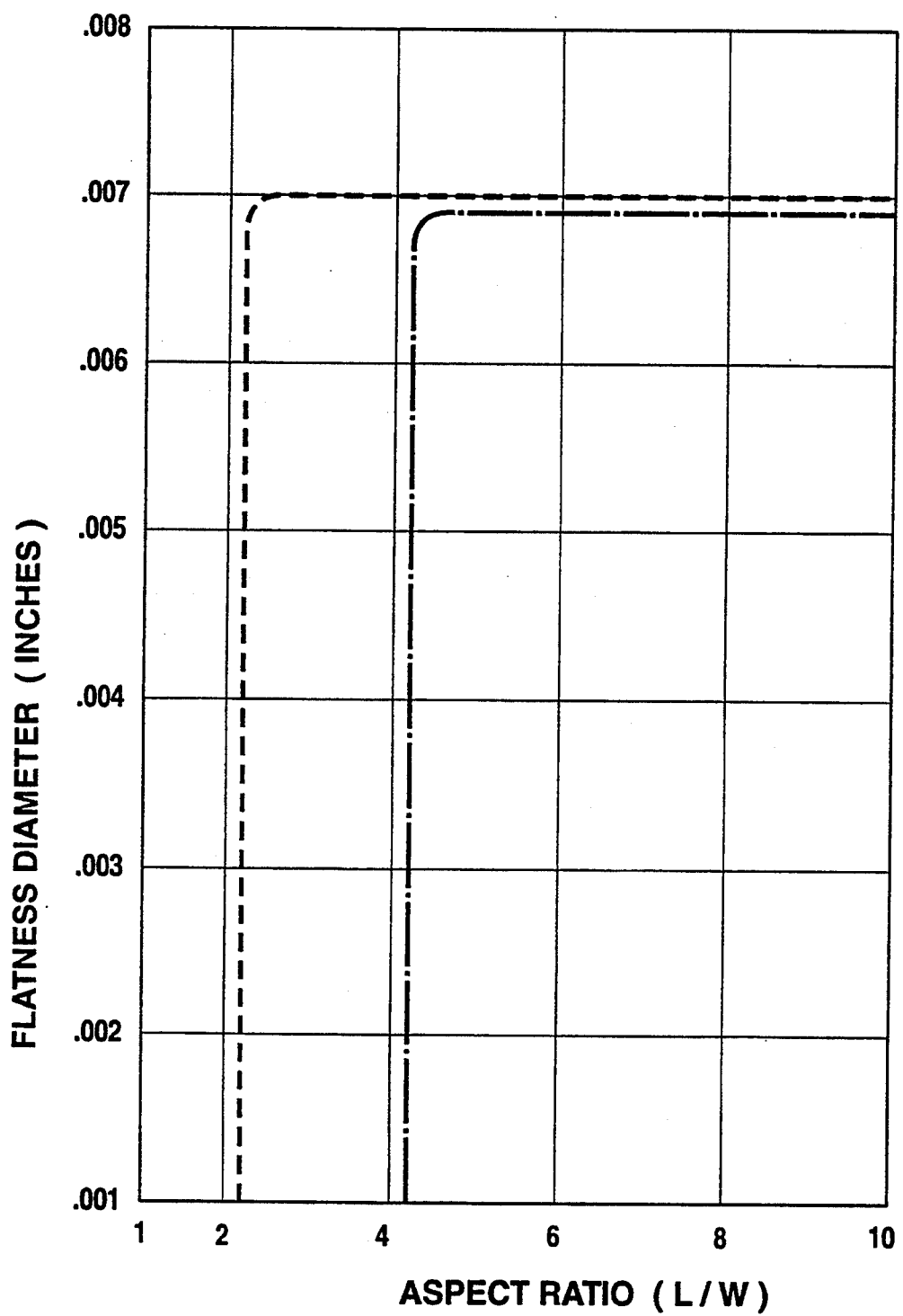
FIG. 1 is a graph illustrating the effective limits of aspect ratio and filament diameter for known fine wire screens.

The relationship of aspect ratios and filament diameters resulting in filament separation or sleaziness in screens made in presently known plain weaves is illustrated in FIG. 1. For meshes having an aspect ratio less than two, filaments of 0.001 inches diameter and greater will not separate. For meshes having an aspect ratio between two and four, separation may occur where filaments less than 0.007 inch diameter are used. For meshes having an aspect ratio greater than four, separation will occur where filaments less than 0.007 inch diameter are used.

Figure 2:
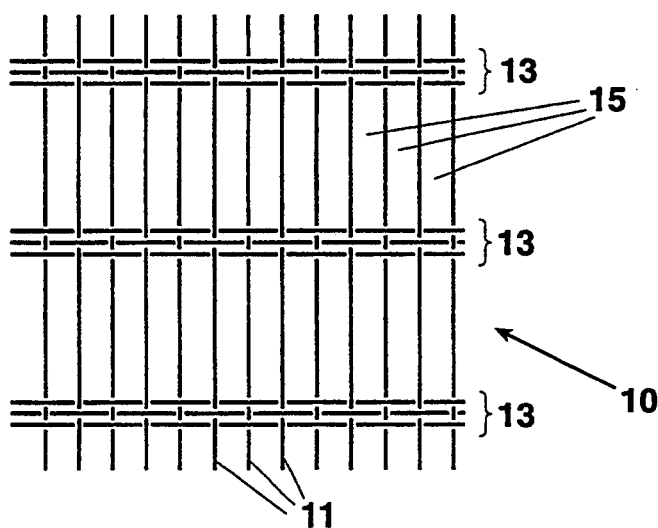
FIG. 2 is an enlarged fragmentary one line plan view of a triple filament warp group woven with shutes taken individually and having rectangular interstices of a ratio in the order of seven.
Figure 3:
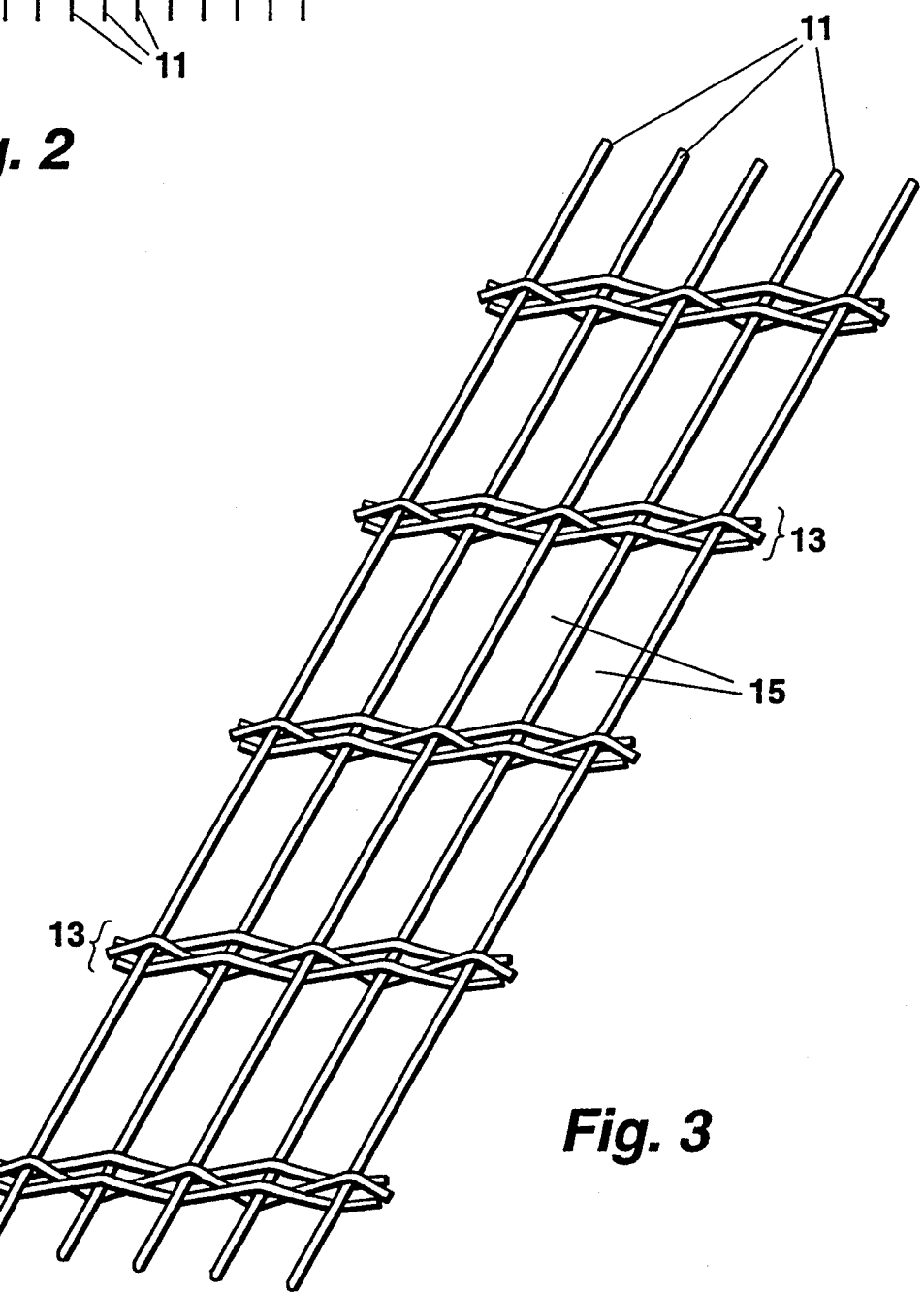
FIG. 3 is an enlarged fragmentary perspective view of the group warp screen of FIG. 2.
Figure 4:
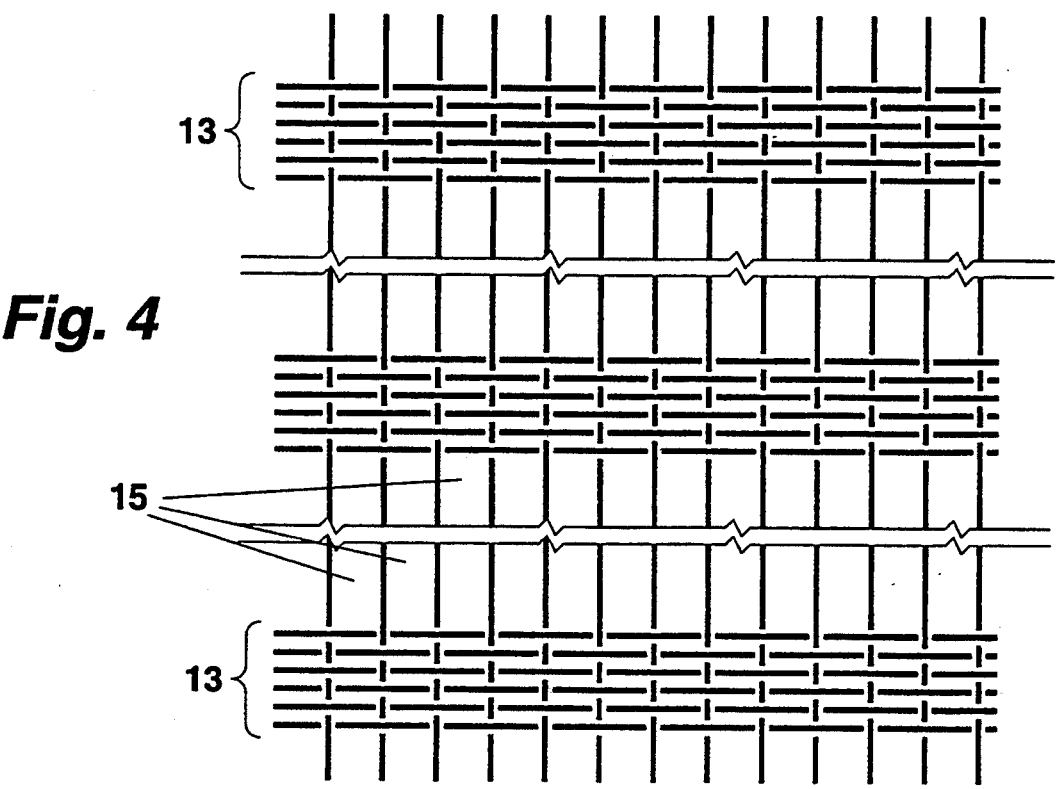
FIG. 4 is an enlarged fragmentary one line plan view of a six filament warp group woven with shutes taken individually.
Figure 5:
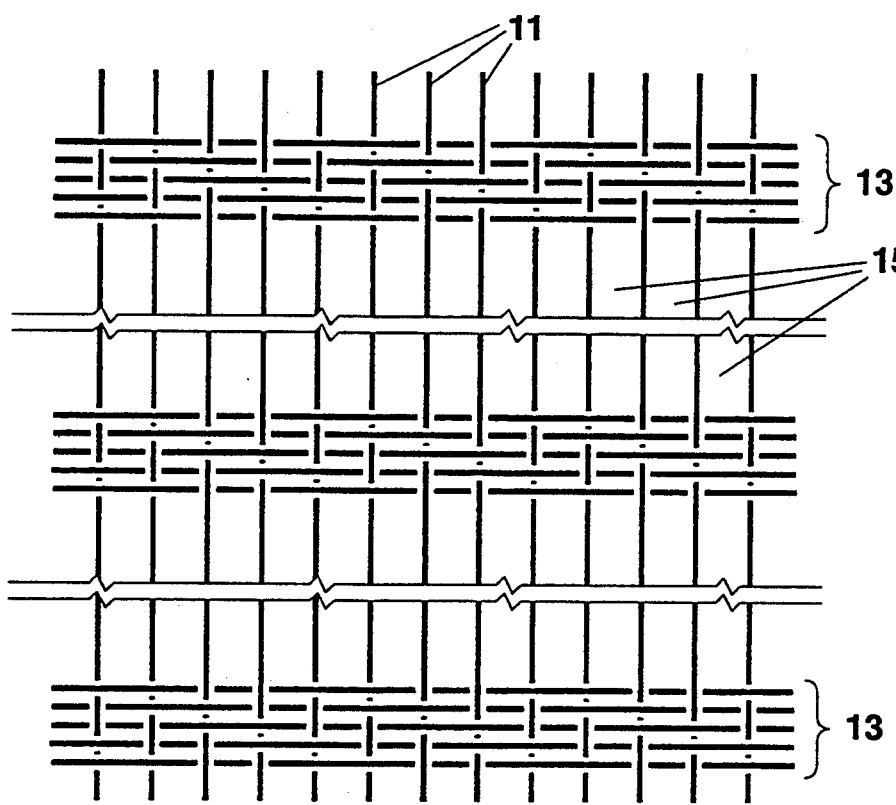
FIG. 5 is an enlarged fragmentary one-line plan view of a five filament warp group woven with shutes taken in pairs.

This problem is significantly minimized by the use of a group warp screen as illustrated in FIGS. 2 and 3. In a group warp, the groups may consist of 3 to 10 or even more warp filaments with the shute filament diameter being at least in the order of 1.1 times the warp filament diameter. The group warp screen 10 shown is characterized in that the shute filaments 11 are secured by groups of warp filaments 13 to form interstices 15. The lengths of the interstices 15 may be approximately four to ten or more, and as shown four, times the width of the interstices 15. The warp filaments 13 of each group are oppositely woven over and under the shute filaments 11 taken individually as shown in FIGS. 2 and 4, or in pairs as shown in FIG. 5 to lock the shute filaments 11 in place and prevent the relative shift or sleaziness of the shute filaments 11 in relation to the warp filaments 13. The twilled weave arrangement taking shute filaments in pairs is preferred for low diameter ratios with very fine wire and fine mesh combination. For example, a 200 mesh equivalent, 1.1 ratio screen would preferably be a twilled weave. In the group warp configuration of FIGS. 2 and 3, the interstices length to width or aspect ratio can be as much as or even exceed 10 for filaments less than 0.0070 inch in diameter and as thin as 0.0010 inch or less in diameter. As always, the rigidity of the filaments used imparts some stability, but a whole new range of combinations of aspect ratio and filament diameter is made possible by the proper selection of group warp members and use of warp/shute diameter ratios lower than those hitherto known. That is, when comparing screens composed of relatively fine filaments of similar dimension and properties, screens employing at least in the order of a 1.1 ratio and a group warp arrangement will have interstices many times the length of the interstices of screens formed by presently known weaving or bonding configurations.

In triple warp screens, for example, if the shute diameter is approximately 1.1 times the warp diameter for warp and shute wires of the same material and properties, sleaziness will be prevented. This is a significant improvement even over the 1.4 ratio of shute to warp diameter of double warp screen, which was itself an improvement over previously known screens. In fact, the conductance of triple warp screens of the present invention is unexpectedly high. The calculated conductance of a triple warp screen is approximately 70% of the conductance of a double warp screen with the same rectangular opening. However, the actual measured conductance of triple warp samples averaged 90.5% of the conductance of double warp screens with the same opening. It is believed that, with the opening held constant, the conductance is reduced by the percentage reduction in the number of rectangular openings per unit area. This is very significant in light of the need to increase the tensile strength in the warp direction without sacrificing conductance.

In the case of finer cloths, particularly 250 mesh equivalent and finer, triple warp diameters may be so fine that a weak cloth with low tensile strength can result. However, by increasing the number of warp wires to 4, 5, 6, 7. . . n, where n may be 10 or more, all three objectives, namely finer particle separation, higher conductance, and longer screen life are still achievable. The added warp filaments provide the necessary strength to enhance screen life while maintaining conductance at a high level.

The following table suggests workable numbers n of filaments per warp group for the stated spacing between shute filaments of diameters approximately 1.1 to 1.2 times the warp diameters.

| MARKET GRADE MESH EQUIVALENT | n |
| --- | --- |
| 80 | 3 or 4 |
| 100 | 4 or 5 |
| 150 | 4 or 5 |
| 200 | 6 or 7 |
| 250 | 6 or 7 |
| 325 | 7 or 8 |

As the diameter ratio increases for a given warp diameter, conductance is reduced.

Furthermore, if desirable for a given application, the bonding of screens formed in the group warp configuration is more acceptable since the decrease in open area resulting from application of the bonding material is more than compensated for by the increase of open area resulting from the increased spacing between groups.

While the invention has been described in relation to shute and group warp filaments, a reversal to warp and group shute relationships is fully within the scope of this invention. Furthermore, the screens may be formed of metal or plastic filaments or filaments of any material suited to a particular application. Moreover, shute and warp filaments could be of different materials, strengths and hardness.

Thus, it is apparent that there has been provided, in accordance with the invention, a screen that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A screen for removing undesirable particles from a liquid comprising:
a first parallel array of filaments of diameter in the range of approximately 0.0010 to 0.0070 inches having spaces therebetween less than a preselected minimal linear dimension of said undesirable particles; and
a second parallel array of groups of at least three filaments transverse to said first array, said filaments of each group being oppositely woven about and between groups of not more than two of said filaments of said first array to secure said first array filaments and maintain said spaces therebetween, said groups of filaments of said second array having spaces therebetween at least equal to said preselected minimal linear dimension of said undesirable particles and said first array filaments having diameters in the order of at least 1.1 times the diameters of said group filaments.

2. A screen for removing undesirable particles from a liquid comprising:
a substantially flat parallel array of shute filaments of diameter in the range of approximately 0.0010 to 0.0070 inches having spaces therebetween less than a preselected minimal linear dimension of said undesirable particles; and a parallel array of groups of warp filaments transverse to said shute filaments, said shute filaments and said groups of warp filaments defining rectangular flow apertures therethrough, said warp filaments of each group being oppositely woven about and between groups of not more than two of said shute filaments to secure said shute filaments and maintain said spaces therebetween, said groups of warp filaments having spaces therebetween greater than said preselected minimal linear dimension of said undesirable particles, said shute filaments having diameters in the order of at least 1.1 times the diameter of said warp filaments, whereby said screen is characterized by rectangular flow apertures therethrough.

3. A screen according to claim 2, said groups of warp filaments each comprising from three to ten filaments.

4. A screen according to claim 2, said groups of warp filaments having spaces therebetween at least four times to as much as ten times the length of said spaces between said shute filaments.

5. A screen according to claim 2, said arrays of shute and groups of warp filaments defining a mesh having openings in the order of approximately 37 to 178 microns by approximately 148 to 4000 microns.

6. A screen according to claim 2, said shute filaments being equally spaced apart.

7. A screen according to claim 2, said groups of warp filaments being equally spaced apart.

8. A screen for removing undesirable particles from a liquid comprising:
a first parallel array of filaments of diameter in the range of approximately 0.0010 to 0.0070 inches having spaces therebetween less than a preselected minimal linear dimension of said undesirable particles; and
a second parallel array of groups of at least three filaments transverse to said first array, said filaments of each group being oppositely woven about and between said filaments of said first array to secure said first array filaments and maintain said spaces therebetween, said groups of filaments of said second array having spaces therebetween at least equal to said preselected minimal linear dimension of said undesirable particles and said first array filaments having diameters in the order of at least 1.1 times the diameters of said group filaments.

9. A screen for removing undesirable particles from a liquid 2 comprising:
a first parallel array of filaments of diameter in the range of approximately 0.0010 to 0.0070 inches having spaces therebetween less than a preselected minimal linear dimension of said undesirable particles; and
a second parallel array of groups of at least three filaments transverse to said first array, said filaments of each group being oppositely woven about and between pairs of said filaments of said first array to secure said first array filaments and maintain said spaces therebetween, said groups of filaments of said second array having spaces therebetween at least equal to said preselected minimal linear dimension of said undesirable particles and said first array filaments having diameters in the order of at least 1.1 times the diameters of said group filaments.

* * * * *